Dec. 27, 1932.  L. G. HUNTER  1,891,932
MOUNTING FOR A PANEL
Filed Aug. 15, 1931    2 Sheets-Sheet 1

INVENTOR
Lytle Gale Hunter
BY
Gifford, Scull & Burgess
ATTORNEYS.

Dec. 27, 1932.  L. G. HUNTER  1,891,932
MOUNTING FOR A PANEL
Filed Aug. 15, 1931  2 Sheets-Sheet 2
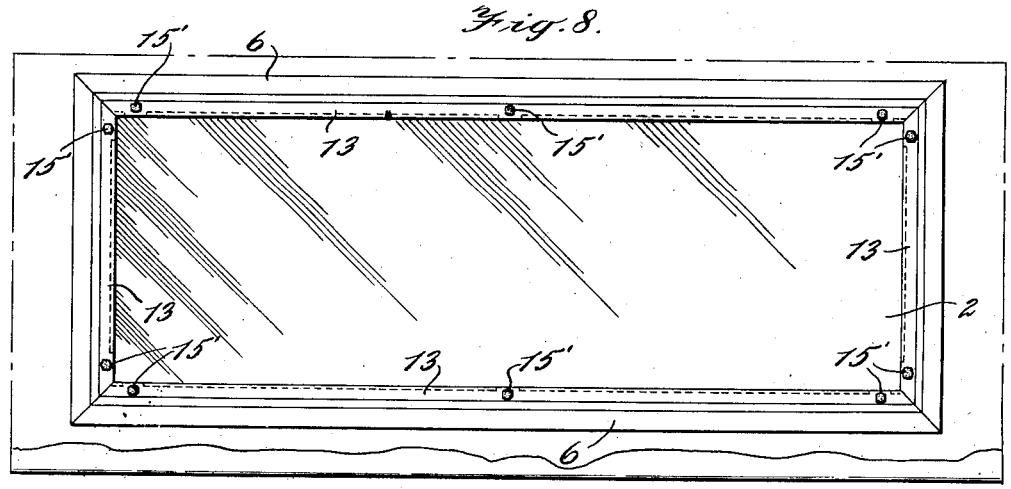
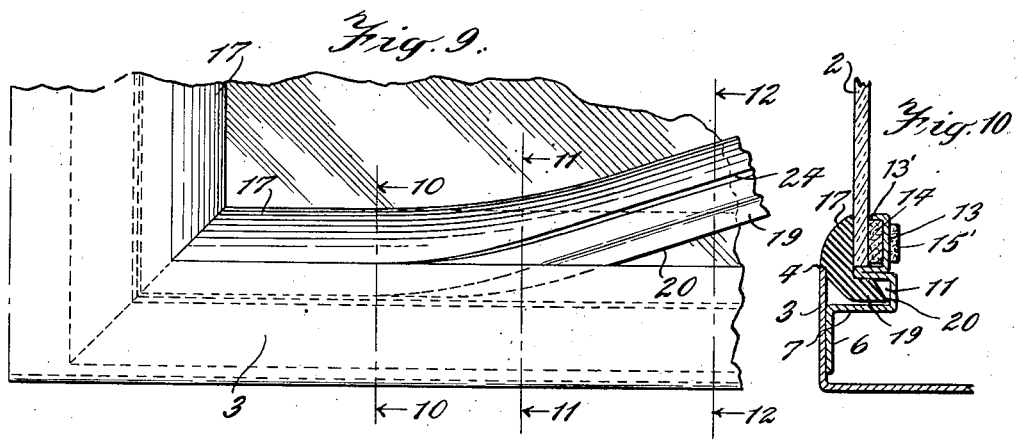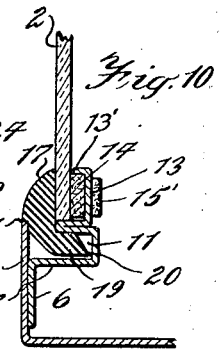
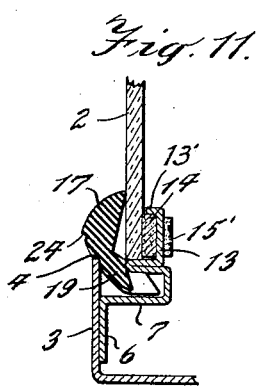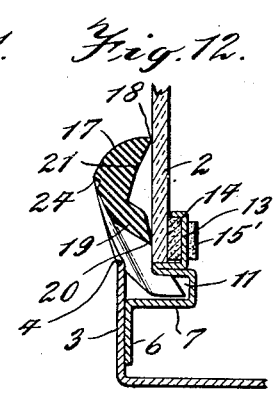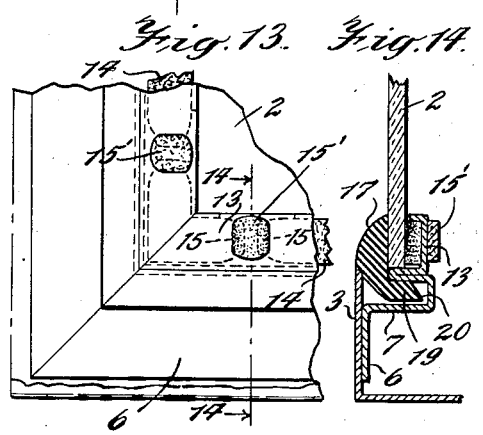
INVENTOR
Lyttle Gale Hunter
BY
Gifford, Scull & Burgess
ATTORNEYS Patented Dec. 27, 1932

1,891,932

UNITED STATES PATENT OFFICE

LYTLE GALE HUNTER, OF FLUSHING, NEW YORK

MOUNTING FOR A PANEL

Application filed August 15, 1931. Serial No. 557,295.

This invention relates to a novel and improved mounting for panels and will be best understood from the following description and the annexed drawings, in which I have shown selected embodiments of the invention, and in which Fig. 1 is a face view of my invention as applied to a sign in a vehicle.

Fig. 2 is a section on the line 2—2 of Fig. 1, but with the panel removed.

Fig. 3 is a section similar to Fig. 2, but with the panel in place.

Figs. 4, 5, 6 and 7 are views similar to Fig. 3, but showing different forms of the invention.

Fig. 8 is a view of the structure appearing in Fig. 1 as seen from the opposite side or rear thereof.

Fig. 9 is a fragmentary view of a corner of the structure appearing in Fig. 1, drawn on an enlarged scale to illustrate the method of applying the strip to hold the panel in place.

Figs. 10, 11 and 12 are sections respectively on the line 10—10, 11—11 and 12—12 of Fig. 9.

Fig. 13 is a fragmentary view on an enlarged scale, showing a portion of the structure appearing in Fig. 8.

Fig. 14 is a section on the line 14—14 of Fig. 13.

Figure 1:
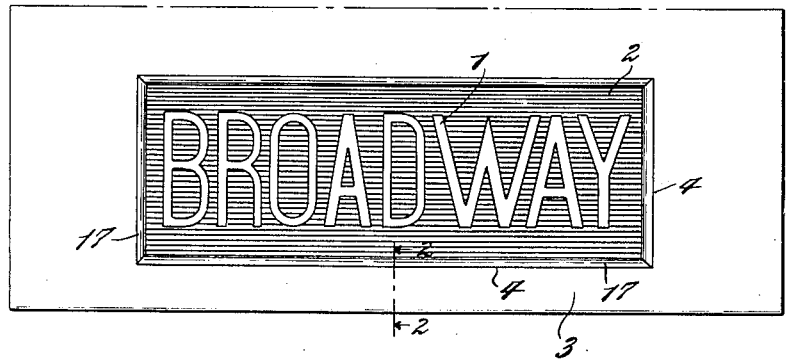
Figure 1:
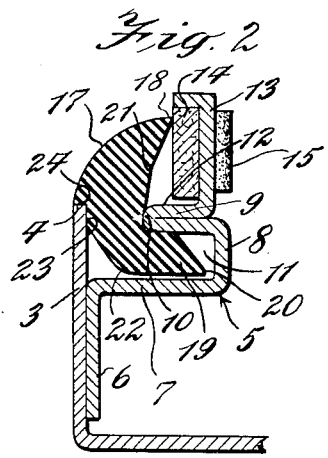
Figure 1:
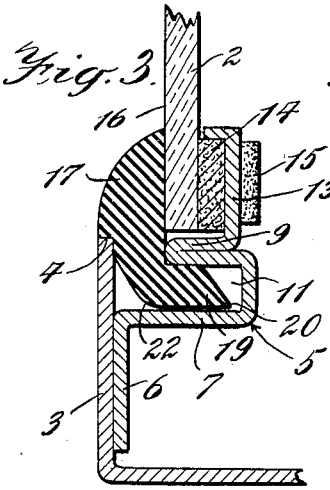
Figure 1:
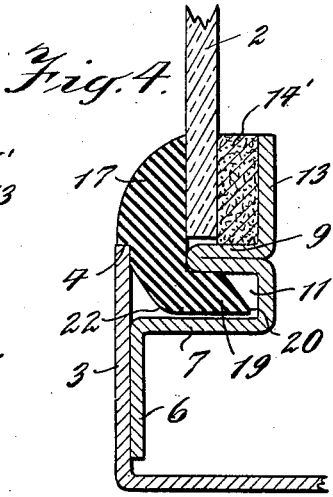
Figure 1:
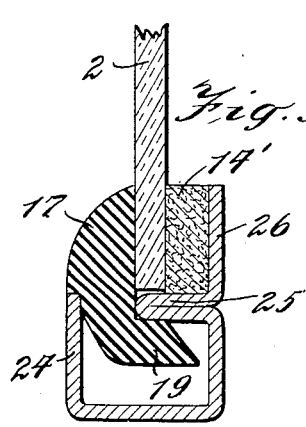
Figure 1:
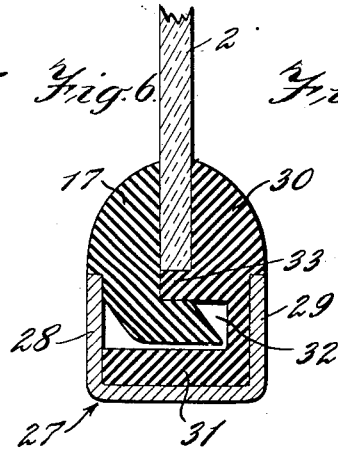
Figure 1:
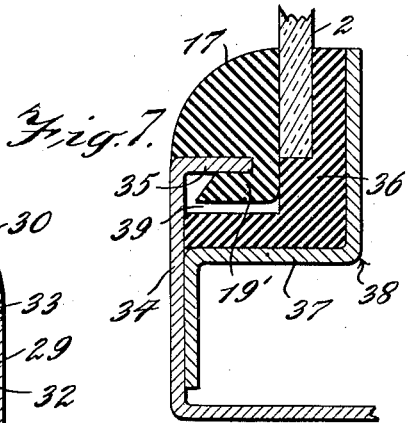

For the purposes of illustration, the invention is shown as applied to the mounting of panes of glass in vehicles, such, for example, as in a vehicle sign 1 as shown in Fig. 1. It is to be understood, however, that the invention may be used in other locations, and that the panel need not be of glass, although the invention finds particular utility when mounting panes of glass. For example, when a pane is used in a vehicle sign, it is highly desirable to secure it in such a way that it may be easily put in place and removed, without disturbing the frame or sash. According to prior art practice, however, this has been difficult, as it has generally been considered necessary to have the parts which hold the glass secured in position by means of screws or other fastening devices. According to this invention, however, all such fastening devices are eliminated, while the panel may be easily put in place and removed.

For the sake of convenience, I shall refer to the face of the panel as the side appearing at the left of Figs. 3, 4, 5, 6, and 7, and the back of the panel as the side appearing at the right thereof. I shall also use the terms "inwardly" and "outwardly" as referring to the center of the panel. It is to be understood that these terms are merely relative, and are not intended as in any way limiting the invention.

The panel 2 may be mounted in a frame having a front wall 3 provided with an edge 4 defining the opening in which the panel is mounted. The frame may conveniently be made of sheet metal, and the wall 3 may be of one piece surrounding the opening. The frame further comprises a bracket 5 having a leg 6 which may be welded to the back of the wall 3. This bracket has a rearwardly extending leg 7 connected to an inwardly extending portion 8, which is shown as bent forwardly and then folded back to form a shelf 9, the forward edge 10 of which is spaced from the edge 4 of the wall 3 to form a relatively narrow throat communicating with the recess 11. The inner surface 12 of the shelf 9 is preferably substantially even with the edge 4. Above the shelf 9, the bracket extends inwardly as indicated at 13, to form a backing for the panel.

In the form shown in Figs. 2 and 3, the backing is further provided with a cushion 14, which may be in the form of a continuous strip of felt or the like held against the backing by being laced at intervals through openings in the backing. These openings are preferably arranged in pairs, as shown at 15 in Fig. 13, and a portion of the strip of felt which has passed through a pair of such openings is indicated at 15′ in various figures of the drawings.

Engaging the face 16 of the panel is a strip 17, which is preferably continuous between corners of the opening in the wall 3, and is also preferably made of solid rubber or other resilient compressible material so as to be substantially homogeneous throughout its cross section. The normal cross section of the strip is shown in Fig. 2, wherein it will be seen that the strip has a nose 18 which, when the panel is not in place, substantially contacts with the cushion 14. When the parts are to be assembled, the cushion is placed in position, and the panel is put in place against the cushion. The nose 18 of the strip is then brought against the face 16 of the panel, and the foot 19 of the strip is forced through the throat formed between the edges 4 and 10 into position in the recess 11. It will be seen that this foot has a pointed toe 20 which will enable it to be inserted in the throat, it, of course, being understood that the foot is bent forwardly for this purpose. Then the entire strip is forced outwardly, and the foot will very quickly snap into place in the recess 11 and the nose will be in engagement with the face 16 of the panel, as will also the face 21 of the strip. To further aid in forcing the foot into the recess, it is provided with a heel 22 curved as indicated, so that it will not bind upon the edge 4.

The method by which the strip is placed in position will be better understood from an inspection of Figs. 9, 10, 11 and 12. As stated above, the panel 2 is first put in position against the backing 13, which, in these figures, is shown as having its upper portion 13' bent forwardly to cover the cushion 14 with which the panel contacts. Then the strip 17 is placed against the face of the panel at one corner thereof, ocupying some such position as shown in section in Fig. 12. One end of the strip may then be forced outwardly so that its foot 19 is received in the recess 11, one of the intermediate stages being illustrated in Fig. 11. At this stage, it will be seen that the curved heel 22 is engaging the edge 4 of the wall 3, and it will be readily understood that this construction will aid in slipping the foot into the recess. At the same time, it will be noticed that the material of the strip is compressed when in the position shown in Fig. 11 and that, as the foot passes through the throat, the material of the strip will expand as the foot snaps into position in the recess, finally assuming the position shown in Fig. 14 and also in Fig. 3. It is convenient to insert one end of the strip adjacent a corner of the panel, as shown in Fig. 9, this being conveniently done by the operator pressing outwardly with his thumb on the strip and then moving the thumb along the strip towards the right of Fig. 9, so as to progressively force the strip outwardly, successive portions of the strip snapping into place.

When the strip is in position, it will be seen that it has a flat surface 23 engaging the back of the wall 3, and that it also has a shoulder 24 engaging the edge 4. The surface 23 is directly opposite a similar surface engaging the edge 10 of the shelf 9, so that the strip is under direct compression between these two surfaces, which define the throat referred to above. The top of the foot also engages beneath the shelf 9, but the bottom of the foot and also the toe are spaced from the adjacent portions of the bracket. The result is a very secure holding of the panel in place, the strip being interlocked with the frame through engagement of the foot of the strip, which extends laterally of the throat and beneath the shelf of the frame. The arrangement also provides a water-tight closure which is of advantage in a mounting, particularly in one where a glass panel is used to cover a sign, because there it is essential to keep water from leaking through on to the sign, as a relatively small amount of water may seriously damage an expensive sign. The portion of the strip above the shelf is under compression which is transmitted to the wall 3 and to the shelf 9, this compression tending to hold the panel against the cushion. The strip may be easily removed by engaging the shoulder 24 with a suitable instrument, and prying it out, in a manner generally the reverse of that described for putting it in place.

Fig. 4 shows an arrangement similar to Fig. 3, except that here the cushion 14' is in the form of a strip which does not pass through any openings in the backing 13.

In Fig. 5 is shown a different embodiment, in which the wall 24 and the shelf 25 are formed of one piece of sheet metal which is extended above the shelf 25 to form a backing 26. In other respects, this form operates in the same manner as that shown in Figs. 3 and 4.

In Fig. 6 is shown another form of the invention, in which the frame is a U-shaped member 27 having a front wall 28 and a rear wall 29. The backing and the cushion are formed together of one piece of material, which may be a solid piece of rubber stripping 30 having a foot 31 and a recess 32, above which is a shelf 33 engaging the outer edge of the panel. The strip 17 is the same as in the other embodiments.

In Fig. 7 is shown still another form which the invention may take, and in this instance the front wall 34 of the frame has a rearwardly extending shelf 35 and the throat is defined between the rearward edge of this shelf and the front face of the backing 36, this backing extending beyond the outer edge of the panel 2 and resting upon a rearwardly extending portion 37 of the bracket 38. A recess 39 is provided beneath the shelf 35, and, in this instance, instead of extending beyond the edge of the panel, the foot 19' of the strip 17' extends beneath the shelf 35. The inner portion of the strip rests upon the inner face of the shelf 35, as plainly shown.

While I have shown the invention as embodied in certain specific forms, it is to be understood that various changes in details may be made without departing from the scope of the invention, and I therefore do not intend to limit myself except by the appended claims.

I claim:

1. In combination, a frame having an opening, a panel disposed in said opening and smaller than the opening, a backing for said panel, a resilient strip of compressible material engaging said panel inwardly of its edge and holding the panel against the backing, and parts on the strip and on the frame disposed outwardly of said opening and having overlapping surfaces extending transversely to the plane of the panel and engaging each other to hold the strip against inward movement.

2. In combination, a panel and a frame disposed adjacent an edge thereof, means forming a throat on said frame beyond the edge of the panel and in front thereof, and a strip engaging the face of the panel and having a portion thereof of resilient compressible material extending through said throat and having a second portion extending laterally from the throat and interlocking with the frame outwardly beyond the throat.

3. In combination, a frame having an edge comprising spaced members forming a throat therebetween, a panel having its edge disposed adjacent said throat on one side thereof, and a strip engaging the face of said panel and having resilient means extending through said throat in contact with opposite sides thereof and expanding into a recess outwardly of the throat.

4. In combination, a frame having an edge formed of spaced members forming a throat therebetween, a panel having its edge disposed adjacent said throat on one side thereof, and a strip of resilient compressible material engaging the face of said panel and extending through said throat in contact with opposite sides thereof into a recess in the frame, said recess being larger laterally than said throat, and a portion of the strip in the recess also being larger than the throat and extending laterally into said recess.

5. In combination, a frame comprising a wall having an edge, a retainer spaced rearwardly from said edge and having a shelf substantially in line with said wall edge but spaced therefrom, a panel having its edge adjacent said shelf and parallel thereto, and a strip of resilient material engaging the face of said panel and extending between the edge of the wall and the edge of the shelf and having a foot engaging the outer surface of the shelf.

6. In combination, a frame comprising a wall having an edge, a retainer spaced rearwardly from said edge and having a shelf substantially in line with said wall edge but spaced therefrom, a panel having its edge adjacent said shelf and parallel thereto, and a strip of resilient material engaging the face of said panel and extending between the edge of the wall and the edge of the shelf and having a foot engaging the outer surface of the shelf, said foot having a pointed toe.

7. In combination, a frame comprising a wall having an edge, a retainer spaced rearwardly from said edge and having a shelf substantially in line with said wall edge but spaced therefrom, a panel having its edge adjacent said shelf and parallel thereto, and a strip of resilient material engaging the face of said panel and extending between the edge of the wall and the edge of the shelf and having a foot engaging the outer surface of the shelf, said foot having a pointed toe and a curved heel.

8. In combination, a frame comprising a wall having an edge, a retainer spaced rearwardly from said edge and having a shelf substantially in line with said wall edge but spaced therefrom, a panel having its edge adjacent said shelf and parallel thereto, a strip of resilient material engaging the face of said panel and extending between the edge of the wall and the edge of the shelf and having a foot engaging the outer surface of the shelf, and means forming a recess beyond said shelf with the outer surface of the shelf forming one wall thereof, said foot being out of contact with the other walls of the recess but in contact with said outer surface of the shelf.

9. In combination, a frame comprising a wall having an edge, a retainer spaced rearwardly from said edge and having a shelf substantially in line with said wall edge but spaced therefrom, a panel having its edge adjacent said shelf and parallel thereto, and a strip of resilient material engaging the face of said panel and extending between the edge of the wall and the edge of the shelf and having a foot engaging the outer surface of the shelf, said strip having a flat surface engaging said wall opposite said shelf.

10. In combination, a frame comprising a wall having an edge, a retainer spaced rearwardly from said edge and having a shelf substantially in line with said wall edge but spaced therefrom, a panel having its edge adjacent said shelf and parallel thereto, a strip of resilient material engaging the face of said panel and extending between the edge of the wall and the edge of the shelf and having a foot engaging the outer surface of the shelf, said strip having a flat surface engaging said wall opposite said shelf, and a shoulder engaging the wall edge.

11. In combination, a frame comprising a wall having an edge, a retainer spaced rearwardly from said edge and having a shelf substantially in line with said wall edge but spaced therefrom, a panel having its edge adjacent said shelf and parallel thereto, and a strip of resilient material having a portion engaging the face of said panel and having a foot extending at right angles to the panel and beyond said shelf.

12. In combination, a frame surrounding an opening, a backing disposed inwardly of the edge of said opening, means cooperating with said backing to hold a panel therebetween, and a cushion disposed between said backing and said panel and comprising a strip of cushioning material secured to the backing by being laced through openings therein.

13. In combination, a frame surrounding an opening, a backing disposed inwardly of the edge of said opening, means cooperating with said backing to hold a panel therebetween, and a cushion disposed between said backing and said panel and comprising a strip of cushioning material secured to the backing by being laced through openings therein, said openings being arranged in pairs with the openings therein closely adjacent one and another and with the pairs spaced apart along the backing.

14. In combination, a frame surrounding an opening, a backing disposed inwardly of the edge of said opening, means cooperating with said backing to hold a panel therebetween, and a cushion disposed between said backing and said panel and comprising a strip of cushioning material secured to the backing by being laced through openings therein and by a forwardly extending portion of the backing substantially covering the cushion.

15. In combination, a frame comprising a wall having an edge, a retainer spaced rearwardly from said edge and having a shelf substantially in line with said wall edge but spaced therefrom, a panel having its edge adjacent said shelf and parallel thereto, a strip of resilient material engaging the face of said panel and extending between and in contact with the edge of the wall and with the edge of the shelf, said strip being compressed between said edges of the wall and shelf, and interlocking elements on said strip and frame preventing movement of the strip inwardly with respect to the edge of the panel.

16. In combination, a frame comprising a wall having an edge, a shelf spaced rearwardly from said edge substantially in line therewith, a panel having its edge adjacent the shelf and parallel thereto, a strip of resilient material engaging the face of said panel and extending between and in contact with the edge of the wall and with the edge of the shelf, said strip being in compression between said panel and said wall edge, and means holding said strip in position and preventing inward movement thereof.

17. In combination, a frame comprising a wall having an edge, a shelf spaced rearwardly from said edge substantially in line therewith, a panel having its edge adjacent the shelf and parallel thereto, and a strip of resilient material engaging the face of said panel and extending between the edge of the wall and the edge of the shelf, said strip extending between the wall and the shelf but having a shoulder engaging the edge of the wall.

18. In combination, a frame having an opening, a panel disposed in said opening and smaller than the opening, a backing for said panel, a resilient strip of compressible material engaging said panel inwardly of its edge and holding the panel against the backing, interengaging parts on the strip and on the frame outwardly of said opening arranged to hold the strip against inward movement, and other interengaging parts on the strip and on the frame to hold the strip against outward movement.

19. In combination, a frame having an opening, a panel disposed in said opening and smaller than the opening, a backing for said panel, a resilient strip of compressible material engaging said panel inwardly of its edge and holding the panel against the backing, interengaging parts on the strip and on the frame outwardly of said opening arranged to hold the strip against inward movement, and other interengaging parts on the strip and on the frame pressing the face of the strip resiliently against the face of the panel.

20. In combination, a frame having an opening, a panel disposed in said opening and smaller than the opening, a backing for said panel, a resilient strip of compressible material engaging said panel inwardly of its edge and holding the panel against the backing, interengaging parts on the strip and on the frame outwardly of said opening arranged to hold the strip against inward movement, and means pressing the face of the strip resiliently against the face of the panel.

LYTLE GALE HUNTER.